(12) United States Patent
Shazly

(10) Patent No.: US 9,348,855 B2
(45) Date of Patent: May 24, 2016

(54) SUPPORTING BIG DATA IN ENTERPRISE CONTENT MANAGEMENT SYSTEMS

(71) Applicant: International Business Machines Corporation, Armonk, NY (US)

(72) Inventor: Hassan A. Shazly, Columbia, SC (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 13/766,661

(22) Filed: Feb. 13, 2013

(65) Prior Publication Data

US 2014/0229514 A1    Aug. 14, 2014

(51) Int. Cl.
G06F 17/30    (2006.01)

(52) U.S. Cl.
CPC .... *G06F 17/30318* (2013.01); *G06F 17/30516* (2013.01); *G06F 17/30864* (2013.01)

(58) Field of Classification Search
CPC ............ G06F 17/30112; G06F 17/30029; G06F 17/30038; G06F 2003/0697; G06F 17/30896; G06F 17/30318; G06F 17/30516; G06F 17/30864
USPC .......................... 707/812, 600, 607, 688, 706
See application file for complete search history.

(56) References Cited

U.S. PATENT DOCUMENTS

| 5,857,203 | A | 1/1999 | Kauffman et al. |
| 6,804,674 | B2 * | 10/2004 | Hsiao ................ G06F 17/30094 |
| 7,668,864 | B2 * | 2/2010 | Benson ................. G06Q 10/10 |
| | | | 707/608 |
| 7,739,311 | B2 | 6/2010 | Smith et al. |
| 7,899,922 | B2 | 3/2011 | Dornbach et al. |
| 8,364,723 | B1 * | 1/2013 | Hseush et al. ................ 707/803 |
| 8,977,600 | B2 * | 3/2015 | Crupi ............................ 707/600 |
| 9,122,688 | B1 * | 9/2015 | Palanki ............. G06F 17/30076 |
| 2003/0018624 | A1 * | 1/2003 | Hsiao ................. G06F 17/30094 |
| 2004/0143597 | A1 * | 7/2004 | Benson ................... G06Q 10/10 |
| 2008/0097998 | A1 | 4/2008 | Herbach |
| 2008/0235289 | A1 * | 9/2008 | Carnes et al. ................. 707/200 |
| 2008/0263152 | A1 | 10/2008 | Daniels et al. |
| 2009/0172696 | A1 | 7/2009 | Meliksetian et al. |
| 2009/0307695 | A1 | 12/2009 | Chandnani |
| 2010/0114952 | A1 * | 5/2010 | Scanlon ............ G06F 17/30604 |
| | | | 707/770 |
| 2010/0138459 | A1 * | 6/2010 | Kasmirsky et al. ........... 707/812 |
| 2011/0282844 | A1 * | 11/2011 | Bates .................... G06F 19/321 |
| | | | 707/661 |
| 2012/0030240 | A1 | 2/2012 | Engelhardt et al. |
| 2012/0030247 | A1 | 2/2012 | Yambal et al. |
| 2012/0078691 | A1 * | 3/2012 | Tsai .................... G06Q 30/0241 |
| | | | 705/14.4 |
| 2012/0078808 | A1 | 3/2012 | Baughman et al. |
| 2012/0078930 | A1 | 3/2012 | Shazly |

(Continued)

OTHER PUBLICATIONS

Tantisiriroj, Wittawat, et al. Data-intensive File Systems for Internet Services: A Rose by Any Other Name . . . (http://repository.cmu.edu/pdl/9/.*

(Continued)

*Primary Examiner* — Jean M Corrielus
(74) *Attorney, Agent, or Firm* — Janaki K. Davda; Konrad, Raynes, Davda & Victor LLP

(57) ABSTRACT

Provided are a method, computer program product, and system for storing a data stream. A distributed library server is configured with a plurality of data servers. A data type is mapped to at least one of the plurality of data servers. A portion of a data stream containing data of the data type is selected. An object part including the portion of the data stream is generated, and the object part is stored at one of the data servers mapped to the data.

21 Claims, 9 Drawing Sheets

(56) References Cited

U.S. PATENT DOCUMENTS

| | | | |
|---|---|---|---|
| 2012/0150906 A1 | 6/2012 | Paknad et al. | |
| 2012/0210083 A1* | 8/2012 | Lawrence | 711/162 |
| 2012/0233522 A1* | 9/2012 | Barton et al. | 714/758 |
| 2014/0229514 A1* | 8/2014 | Shazly | G06F 17/30318 707/812 |
| 2014/0351233 A1* | 11/2014 | Crupi | G06F 17/30516 707/706 |

OTHER PUBLICATIONS

Pan et al.; "An Intelligent Agent Framework for Enterprise Integration", IEEE Transactions on Systems, Man, and Cybernetics, vol. 21, Issue 6, Nov./Dec. 1991, pp. 1391-1408.

ip.com et al.; "Method for Migrating Heterogeneous Document Types With Dynamic Metadata . . . Target ECM's Schema for Each Document Type", IPCOM000167400D, Feb. 12, 2008.

Xu et al.; "Integrating Hadoop and Parallel DBMS", SIGMOD '10: Proceedings of the 2010 International Conference of Management on Data, ACM 978-1-4503-0032-2, Jun. 2009, pp. 969-974.

Pavlo et al.; "A Comparison of Approaches to Large-Scale Data Analysis", SIGMOD '09: Proceedings of the 2009 ACM SIGMOD International Conference on Management of Data, ACM 978-1-60558-551-2, Jun. 2009, pp. 165-178.

Thusoo et al.; "Hive—A Warehousing Solution Over a Map-Reduce Framework", VLDB '09: Proceedings of the VLDB Endowment, vol. 2, Issue 2, Aug. 2009, pp. 1626-1629.

Azemovic et al.; "Comparative Analysis of Efficient Methods for Storing Unstructured Data Into Database With Accent on Performance", 2010 2nd International Conference on Education Technology and Computer (ICETC), IEEE 978-1-4244-6367-1, Jun. 2010, pp. V1-403-V1-407.

Friedman et al.; "SQL/MapReduce: A Practical Approach to Self-Describing, Polymorphic, and Parallelizable User-Defined Functions", VLDB '09: Proceedings of the VLDB Endowment, vol. 2, Issue 2, Aug. 2009, pp. 1402-1413.

Ozcan et al.; "Emerging Trends in the Enterprise Data Analytics: Connecting Hadoop and DB2 Warehouse", SIGMOD '11: Proceedings of the 2011 ACM SIGMOD International Conference on Management of Data, ACM 978-1-4503-0661-4, Jun. 2011, pp. 1161-1164.

Stoenbraker et al.; "MapReduce and Parallel DBMSs: Friends or Foes?", Communications of the ACM, vol. 53, No. 1, Jan. 2010, pp. 64-71.

Stonebraker et al.; "Ten Rules for Scalable Performance in 'Simple Operation' Datastores", Communications of the ACM, vol. 54, No. 6, Jun. 2011, pp. 72-80.

Chen et al.; "Efficiently Support MapReduce-like Computation Models Inside Parallel DBMS", IDEAS '09: Proceedings of the 2009 International Database Engineering & Applications Symposium, ACM 978-1-60558-402-7, Sep. 2009, pp. 43-53.

Cattell, Rick; "Scalable SQL and NoSQL Data Stores", ACM SIGMOD Record, vol. 39, Issue 4, Dec. 2010, pp. 12-27.

Hazelhurst; "PH2: An Hadoop-based Framework for Mining Structural Properties From the PDB Database", SAICSIT '10: Proceedings of the 2010 Annual Research Conference of the South African Institute of Computer Scientists and Information Technologists, ACM 978-1-60558-950-3, Oct. 2010, pp. 104-112.

Nambiar et al.; "Massive Structured Data Management Solution", CIKM '10: Proceedings of the 19th ACM International Conference on Information and Knowledge Management, ACM 978-1-4503-0099-5, Oct. 2010, pp. 1905-1908.

Xu et al.; "A Hadoop Based Distributed Loading Approach to Parallel Data Warehouses", SIGMOD '11: Proceedings of the 2011 ACM SIGMOD International Conference on Management of Data, ACM 978-1-4503-0661-4, Jun. 2011, pp. 1091-1100.

* cited by examiner

SUPPORTING BIG DATA IN ENTERPRISE CONTENT MANAGEMENT SYSTEMS

BACKGROUND

The present invention relates generally to systems and methods for storing multiple continuous streams of related data (Big Data) in an enterprise content management system.

A content management system (CMS) (also known as an enterprise content management system (ECMS)) may be described as a software system used to store and organize unstructured content. This unstructured content includes (but is not limited to) documents, images, audio files, videos, reports, business records, and Web content.

Big Data has been described as unstructured continuous streams of data that are too large to store and handle using common database management tools. Some examples of Big Data include surveillance video streams, medical images, and business transactions. Conventional ECMS systems, even with large object support, cannot support multiple continuous streams of Big Data. Accordingly, there is a need for using ECMSs to store, manage, and retrieve Big Data.

SUMMARY

Provided are a method, computer program product, and system for storing a data stream. A distributed library server is configured with a plurality of data servers. A data type is mapped to at least one of the plurality of data servers. A portion of a data stream containing data of the data type is selected. An object part including the portion of the data stream is generated, and the object part is stored at one of the data servers mapped to the data.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvements over technologies found in the marketplace, or to enable others of ordinary skill in the art to understand the embodiments disclosed herein.

Figure 1:
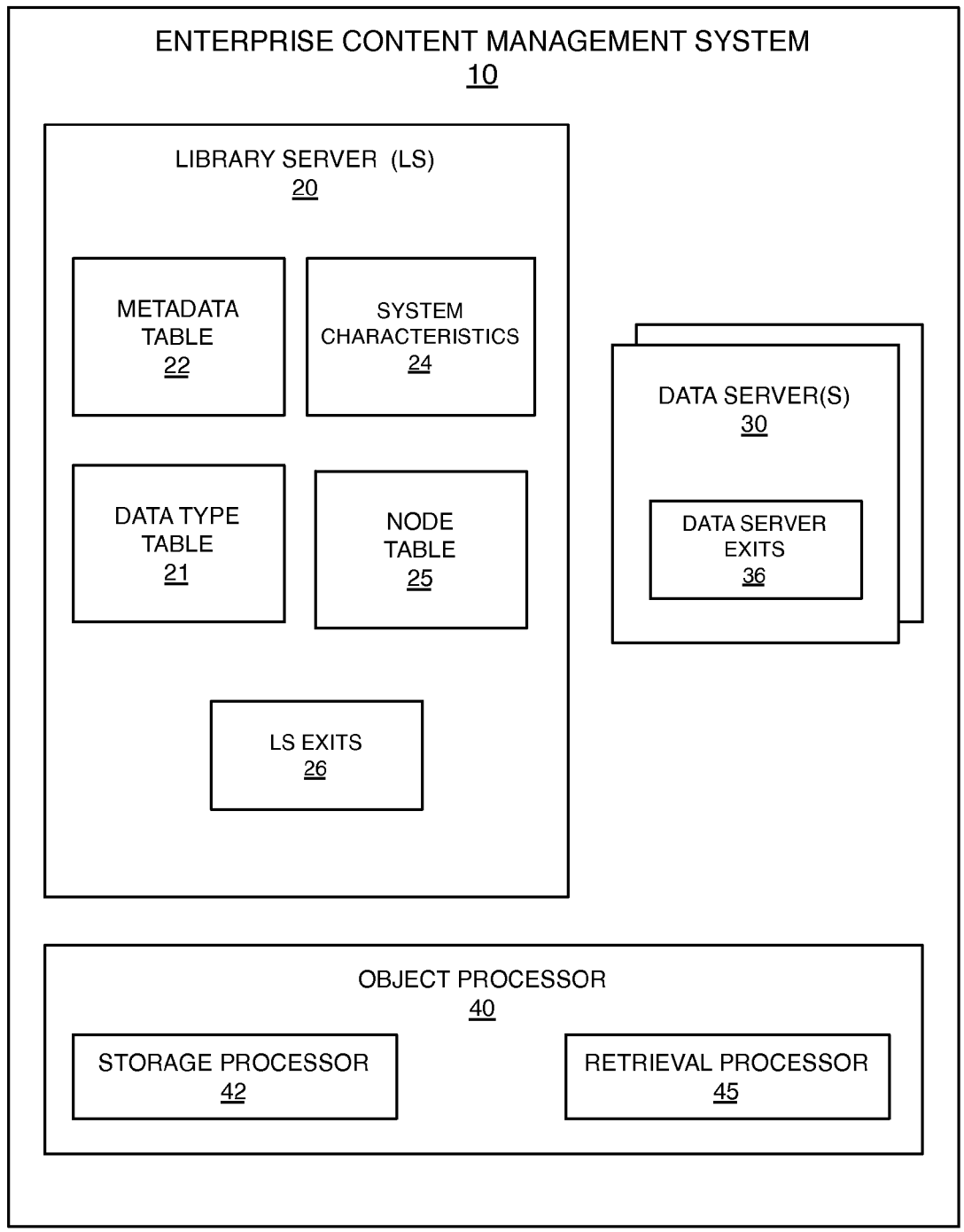
FIG. 1 is a high-level block diagram of a conventional content management system.

FIG. 1 is a high-level block diagram of a conventional enterprise content management systems (ECMS). As illustrated in FIG. 1, ECMS 10 includes a library server (LS) 20, at least one data server 30, and an object processor 40. The ECMS 10 may comprise multiple physical computer nodes, or a single computer. The conventional library server 20 includes library server exits 26, system characteristics 24, metadata table 22, node table 25, and data type table 21. Objects stored in the ECMS are classified by common data characteristics (hereinafter, referred to as data type). For example, in certain embodiments, patient x-ray data is mapped to a "x-ray" data type (including images, text reports, audio, and video). The data type classification is flexible and user defined, however, each data type is unique within the ECMS. The data type table 21 maps a data type to data characteristics. The metadata table 22 contains data describing the data maintained by the ECMS 10 (e.g., indexing information). The node table 25 contains location information for the data server 30 nodes that are part of the ECMS 10. Exits are processes that extend the functionality of the ECMS. The library server exits 26 provide a mechanism for extending the functionality of the library server, and are generally used to generate and/or manipulate indexes. For example, a library server exit 26 may be applied to input data to populate metadata table 22 with indexing information. The system characteristics 24 are configurable parameters that affect the system, and may also include information such as user identification information.

The conventional data server 30 stores objects and includes data server exits 36. In some conventional systems, objects are stored in a storage hierarchy that automatically migrates objects from faster to slower devices based on the age or frequency of access. The data server exits 36 provide a mechanism for extending the functionality of the data servers 30. In some conventional systems, the data server exits 36 include a pre-store processing exit, and a retrieval exit. The pre-store processing exit enables object modification before storage. The retrieval exit enables object modification before producing the object to the retrieval requesting process (e.g., changing format from a MPEG 3 to MPEG 4).

The object processor 40 includes storage processor 42 and retrieval processor 45. The storage process 42 supports the functions for storage of objects, and the retrieval process 45 supports the functions for object retrieval. When an object is stored in the ECMS 10, the storage processor 42 updates the library server 20 with information about the object being stored, and then submits the data to be stored to one of the data servers 30. During the storage process a library server exit 26, and a data server exit 36 may be invoked. When an object is retrieved, the retrieval processor 45 performs a query in the library server 20 for the object, and upon finding the object and the data store 30 containing the object; the retrieval processor 45 retrieves the object from data store 30 and provides the object to the requesting process.

Certain conventional ECMS 10 store large unstructured objects, greater than the size limitation of the data servers 30, by partitioning the object and linking the partitions with a piece map. The storage process 42 is configured to process large objects with the piece map, and the retrieval process 45 is configured to combine the pieces when providing a retrieved object to a retrieval requesting process. The conventional ECMS 10 lacks the capacity for working with multiple continuous streams of data containing data with varying data formats.

Figure 2A:
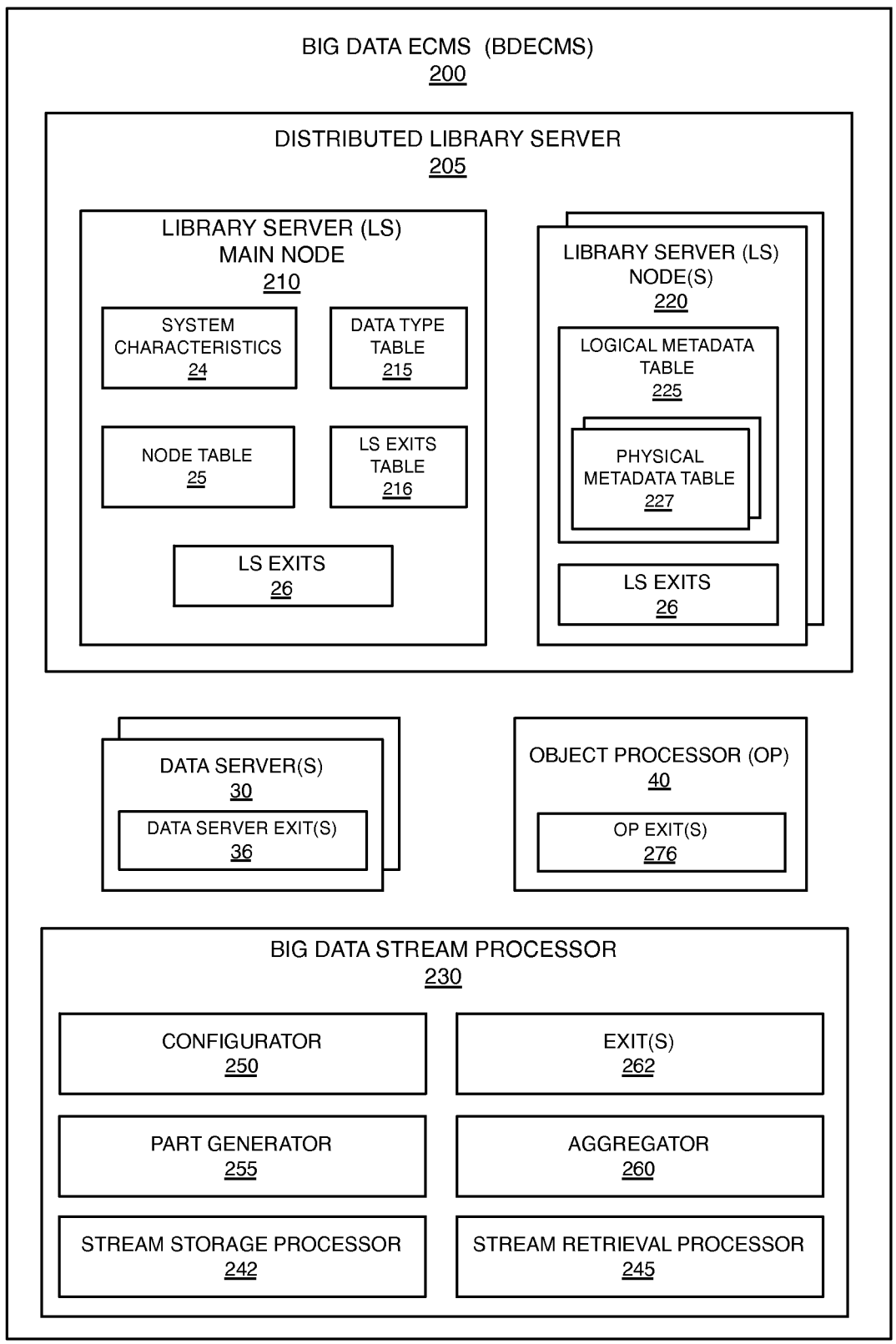
FIG. 2A is a block diagram, illustrating the Big Data ECMS, according to one embodiment of the invention.

FIG. 2A is a block diagram, illustrating the Big Data ECMS computing architecture, in accordance with certain embodiments. As illustrated in FIG. 2A, Big Data ECMS (BDECMS) 200 includes a distributed library server 205, data servers 30, object processor 40, and a Big Data stream processor 230. In an embodiment, the distributed library server 205 includes a library server main node 210 and one or more library server nodes 220. Library server main node 210 includes system characteristics 24, node table 25, data type table 215, library server exits table 216, and library server exits 26. In an embodiment, library server exits table 216 maps exit names to exit locations thereby enabling flexibility in the exit processing location. Exits enable the processing of a data stream with an executable process. In certain embodiments, the library server main node 210 may distribute exit code to locations identified in the library server exit table 216. In certain other embodiments, library server table 216 may provide multiple locations for an exit, and the BDECMS 200 selects the location to provide the most efficient processing. Node table 25 maps server nodes to physical locations. In an embodiment, node table 25 contains records for the library server nodes 220 and the data servers 30. Data type table 215 identifies the data types within the BDECMS (data types are unique throughout the BDECMS) and provides a mapping of a data type to at least one of the data server nodes 220.

Object processor (OP) 40 comprises the storage processor 42 and retrieval processor 45 (not shown in FIG. 2A) and additionally comprises OP exits 276. Exits 276 are a collection of processing exits that may be executed on the OP.

Figure 2B:
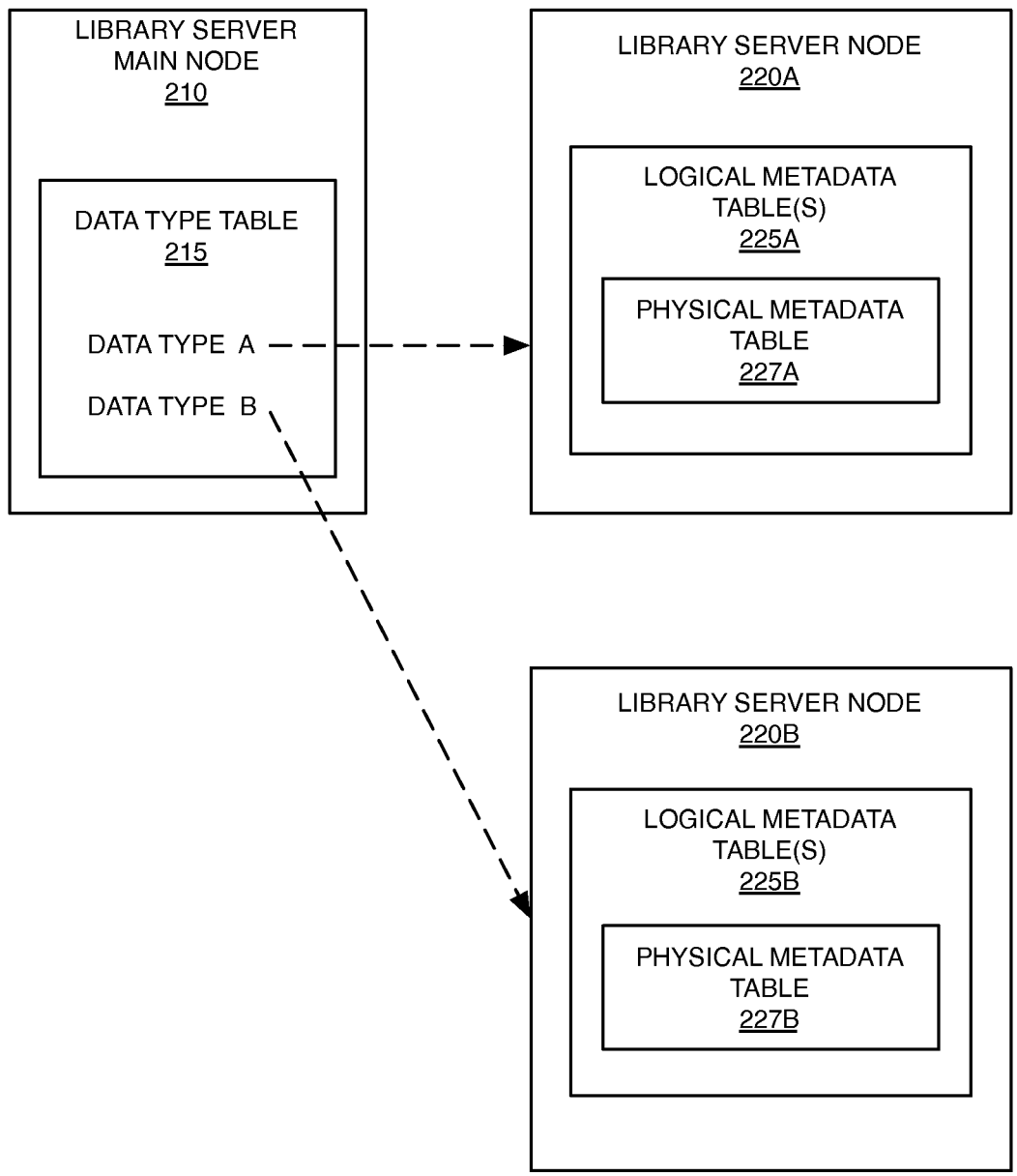
FIG. 2B illustrates an embodiment of a distributed library server with library server nodes.

Each library server node 220 contains a logical metadata table 225, which in turn is comprised of physical metadata tables 227. The physical metadata tables 227 contain the storage location for object parts. FIG. 2B illustrates an embodiment of a distributed library server with library server nodes. As FIG. 2B illustrates, library server main node 210 contains data type table 215. Data type table 215 contains records of data types; each record identifies the data type and reference information to the associated logical metadata table. Two data types are illustrated in data type table 215: data type "A" and data type "B." The record in table 215 corresponding to data type "A," references logical metadata table 225A located on library server node 220A. The record for data type "B," references logical metadata table 225B located on library server node 220B. Logical data table 225A indicates the physical metadata tables associated with data type "A." In an embodiment, the logical data table 225A matches the corresponding data type name. For example, if data type "A" is "x-ray" the logical metadata table 225A is named x-ray. In an embodiment, the physical metadata tables 227 are named by concatenating the logical metadata table name and a sequence number (the sequence number is based on the creation sequence). For example, the first physical metadata table for data type x-ray is named x-ray-01 and entries in the physical metadata table point to the physical location of objects associated with x-ray-01.

For example, four x-rays of patient-A are streamed to the BDECMS 200. The x-ray information is classified as data type "x-ray." The logical metadata table 225 is named x-ray, and the first physical metadata table is created and named x-ray-001. The entries of the physical metadata table x-ray-001 would contain the following:

| SSN | DATE | VIEW | NODE | FILENAME | OBJECT PART |
|---|---|---|---|---|---|
| 1234 | Dec. 12, 2012 | front | 1 | patient-A01 | 1 |
| 1234 | Dec. 12, 2012 | back | 3 | patient-A01 | 2 |
| 1234 | Dec. 12, 2012 | right | 25 | patient-A01 | 3 |
| 1234 | Dec. 12, 2012 | left | 2 | patient-A01 | 4 |

Each record in the physical metadata table is composed of a set of indexes and information describing the data storage location. In the example above, the indexes include SSN, date and view, and the information describing the data storage location includes the node, filename, and object part. The node is mapped (using node table 25) to a data server 30 on which the actual object part is stored; a request to the specific data server 30 for the filename and object part returns the object part requested. In an embodiment using the example above, to locate a data type x-ray, with the front view for patent with SSN=1234 on date=12/12/2012, a search is performed on the data type table 215 for data type x-ray. The table 215 indicates the library server node 220 containing the relevant logical metadata table 225. A search of the logical metadata table 225 for all the object parts contained in associated physical metadata tables 227 is performed. The result of the search indicates the node, filename, and object part; a request is made to the data server node 30 (using node table 25 to provide the address of the data server node) to receive the object part requested.

BDSP 230 contains stream storage processor 242, stream retrieval processor 245, configurator 250, aggregator 260, part generator 255, and exits 262. The stream storage processor 242 receives streams to be stored and processes the stream with the configurator 250, and part generator 255. Configurator 250 is a subcomponent used to configure the BDECMS 200. The part generator 255 separates a stream of data into object parts, and performs processes associated with storage of the object parts. Stream retrieval processor 245 provides streams stored as a collection of object parts to a requesting process. Aggregator 260, combines information from multiple objects parts into a single stream. In an embodiment, the aggregator 260 generates a stream header and aggregates the object parts comprising the stream for processor 245. Exits 262 are a collection of processing exits that may be executed on the BDSP.

The following is a detailed explanation of an example implementation according to one embodiment of the present invention. In this "traffic_cam" example, a traffic camera monitors a traffic light and produces data concerning the vehicles passing the traffic light. The traffic camera has the capability of providing a stream of video data (in various resolutions and formats), images of license plates, and text reporting the time and color of the traffic light. The data produced by the traffic camera is illustrated below:

| DATA | FORMAT | RESOLUTION |
|---|---|---|
| Video from 7 AM to 9 AM | MPEG | HIGH |
| License Plate Images 7 AM to 9 AM | JPEG | MEDIUM |
| Video from 9 AM to 5 PM | MPEG | LOW |
| Traffic Signal Data 9 AM to 5 PM | TEXT | N/A |

In this example the data is classified as data type "traffic_cam." The data is streamed over a data channel and a control channel is used to indicate changes in the data. For example, the control channel provides information indicating a change in format, resolution, or data provided.

Figure 3:
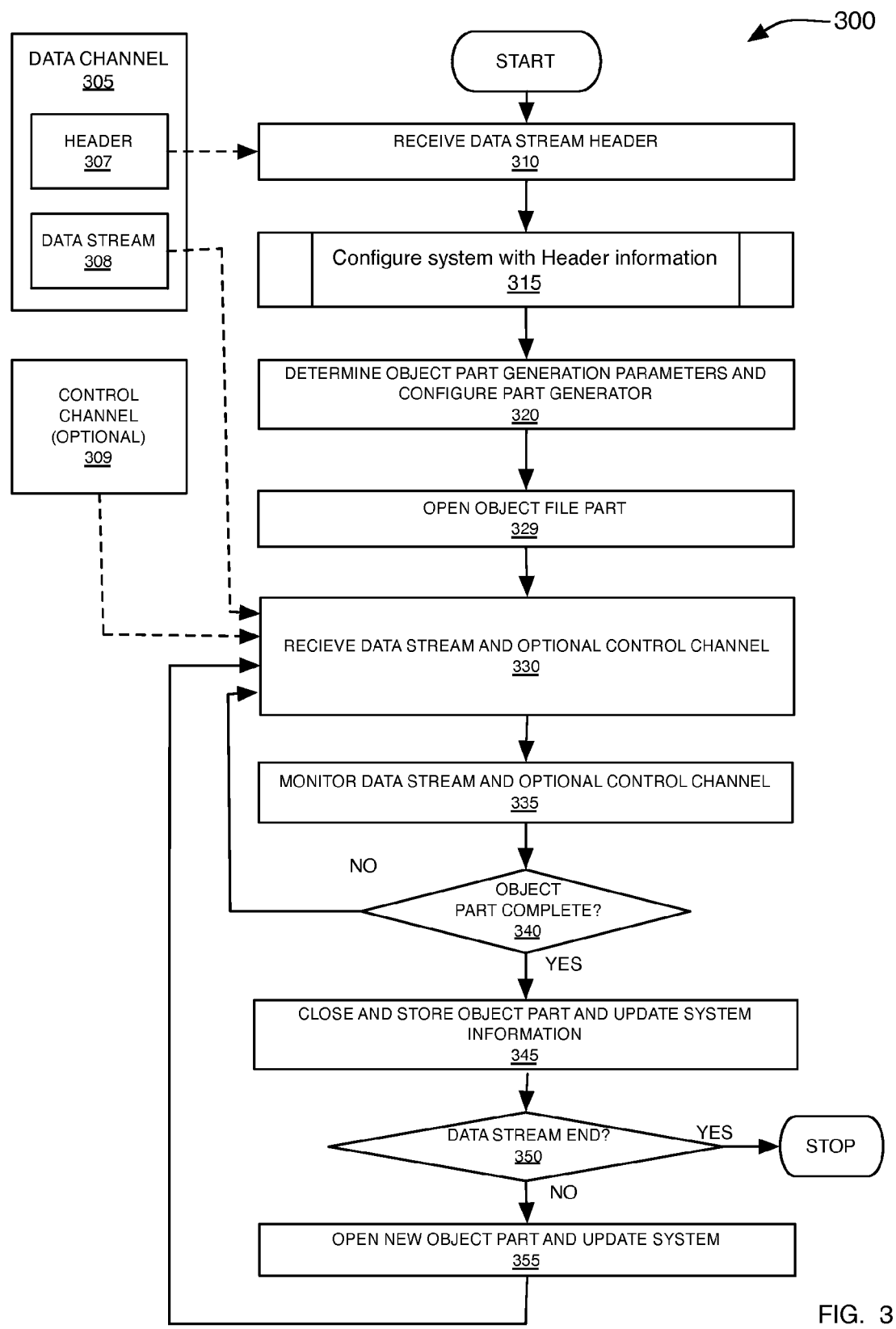
FIG. 3 is a flowchart depicting a process for processing a data stream in the BDCEMS, in accordance with certain embodiments.

FIG. 3 is a flowchart depicting a process 300 for processing a data stream in the BDECMS 200, in accordance with certain embodiments. FIG. 3 includes input from a data channel 305 and an optional control channel 309. Data channel 305 includes a header 307 and data stream 308. The optional control channel 309 provides information about the data channel 305. In certain embodiments, the optional control channel 309 provides a signal indicating a change to the data format (e.g. video to text, or resolution change).

Processing starts at 310 where the header 307 is received. In an embodiment, the stream storage processor 242 reads the header 307 and identifies information in the header 307. In an embodiment of the traffic_cam example, the header 307 for "Video from 7 AM to 9 AM" identifies the data type as "traffic_cam," format MPEG, resolution HIGH, and data name VIDEO7AM9AM. At step 315, discussed in greater detail with reference to FIG. 4, the BDECMS 200 is configured with information from the header 307. The configuration of the BDECMS 200 includes the creation of a logical metadata table 225 (if a logical metadata table 225 did not previously exist for the data type). In an embodiment of the traffic_cam example, a logical metadata table 225 named "traffic_cam" is created on the library server node 220 identified for the data type traffic_cam, and a physical metadata table 227 is created named traffic_cam_001.

In step 320, the part generation parameters are determined. In an embodiment, the stream storage processor 242 determines the mechanism for part generation (e.g., data size based, control channel based, or time based) and the configurator 250 configures the part generator 255 based on the mechanism. In an embodiment, if the mechanism for part generation is data size based and the data is of a single format, the size of each object part is based on the physical size limit for an object part for server node 220. In an embodiment of the traffic_cam example the mechanism for part generation is control channel based.

Processing continues to step 329 where the object part is opened and an entry is added to the physical metadata table 227 corresponding to the object part. In an embodiment of the traffic_cam example, a row is added to physical metadata table 227 traffic_cam_001 identified as object part number 1. Processing continues to step 330 where data stream 308 is received; optional control channel 309 may also be received. In an embodiment of the traffic_cam example, the "Video from 7 AM to 9 AM" is received as a data stream 308. In certain embodiments, the data stream is processed at this step; processing the data stream is performed with an executable process (e.g., an exit). Processing continues to step 335 where the data stream is monitored, and if an optional control channel is used the control channel is also monitored. In an embodiment, the optional control channel is monitored for a control signal indicating a change in data format, or a control signal indicating the end of the object part. In step 340, based on the monitoring in step 335 a determination is made as to whether the object part is complete; if so the processing continues to step 345, otherwise processing continues with step 330. In an embodiment, part generator 255 determines if the object part is complete based on the part generator 225 configurations. At step 345, the object part is closed and the BDECMS 200 system is updated. Processing continues to step 350 where a determination is made as to whether the data stream is complete. If the data stream is complete and no additional data is being received, process 300 stops, otherwise processing continues to step 355. At step 355, a new object part is created and the BDECMS 200 system is updated with information for the new object part, and processing continues to step 330.

Figure 4:
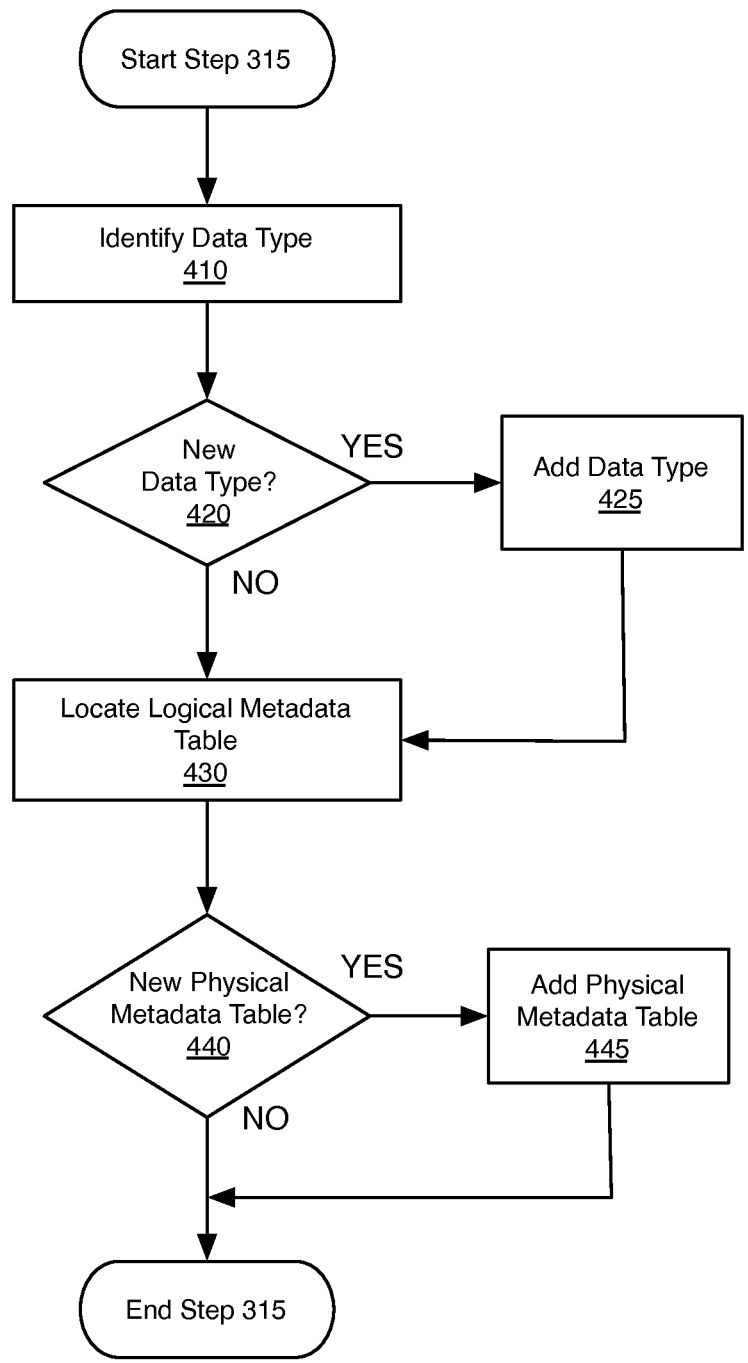
FIG. 4 is a flow chart illustrating a method for identifying header information and configuring the Big Data ECMS, in accordance with certain embodiments.

FIG. 4 is a flow chart illustrated a method 400 corresponding to step 315 for identifying header information and configuring the system. At step 410, the data type is identified using information in the header 307. At step 420, if the data type identified is new to the BDECMS 200, processing continues to step 425, otherwise processing continues to step 430. In an embodiment, a data type is determined new to the BDECMS 200 when the data type is not found in data type table 215. At step 425, the data type is added to the BDECMS 200, and processing continues to step 430. In an embodiment, adding a new data type includes updating data type table 215 and creating a logical metadata table 225.

At step 430, the logical metadata table is located. In an embodiment, the data type in data type table 215 points to the logical metadata table. Processing continues to step 440 where a determination is made as to whether a new physical metadata table 227 is required; if so processing continues to step 445, otherwise processing ends for step 315. In an embodiment, the information in the header 307 is used to determine if a new physical metadata table 227 is required. Step 445 adds the physical metadata table 227. In an embodiment implementing the traffic_cam example, the physical metadata table 227 traffic_cam_001 contains four rows, each row describing an object part and the storage node location for the object part.

Although not shown in FIG. 3, certain embodiments of process 300 include exit processing such as pre-storage process. In certain embodiments, not shown in FIG. 3, the header 307 indicates the object part is to be appended to an existing object part, and in such situations the existing object part is located and the data is appended to the existing object part, rather than creating a new object part. In certain embodiments, text information contained in the data stream is used to index the object part. In the traffic_cam example, text information about the traffic signal may be used to index the license plate images. In certain other embodiments applied to the traffic_cam example, an executable process, provided as an exit, is used to perform image analysis on the license plate images and provide the license plate number for the license plate image. Another executable process, provided as an exit, indexes the license plate images with the text provided by image analysis.

In various embodiments, the present invention provides numerous advantages over the prior art. For instance, an enterprise may migrate an existing ECM system to a BDECMS installation while maintaining the data lifecycle and custom exits developed with an existing ECM system. In one embodiment, the BDECMS provides storage for a virtually unlimited stream of data containing multiple data types and formats. The BDECMS enables data storage as physical files, database records, or any storage supported by data stores. In certain embodiments, the number of simultaneous video streams received and processed by the BDECMS is virtually unlimited, limited only by the configured number of library server nodes and data server nodes. In certain embodiments, pre and post processing exists may be distributed thereby avoiding bottlenecks.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
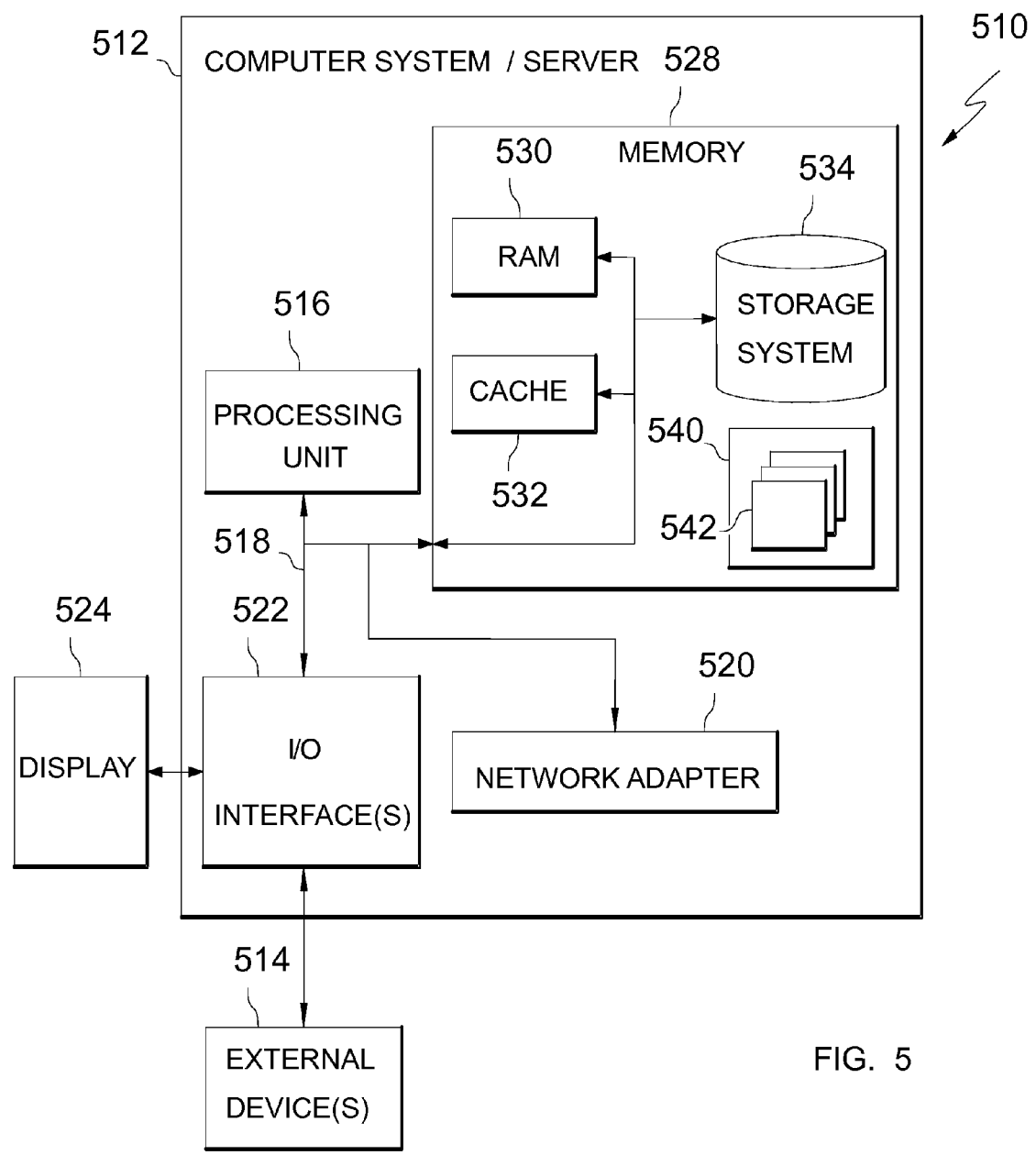
FIG. 5 depicts a cloud computing node in accordance with certain embodiments.

Referring now to FIG. 5, a schematic of an example of a cloud computing node is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to a processor or processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
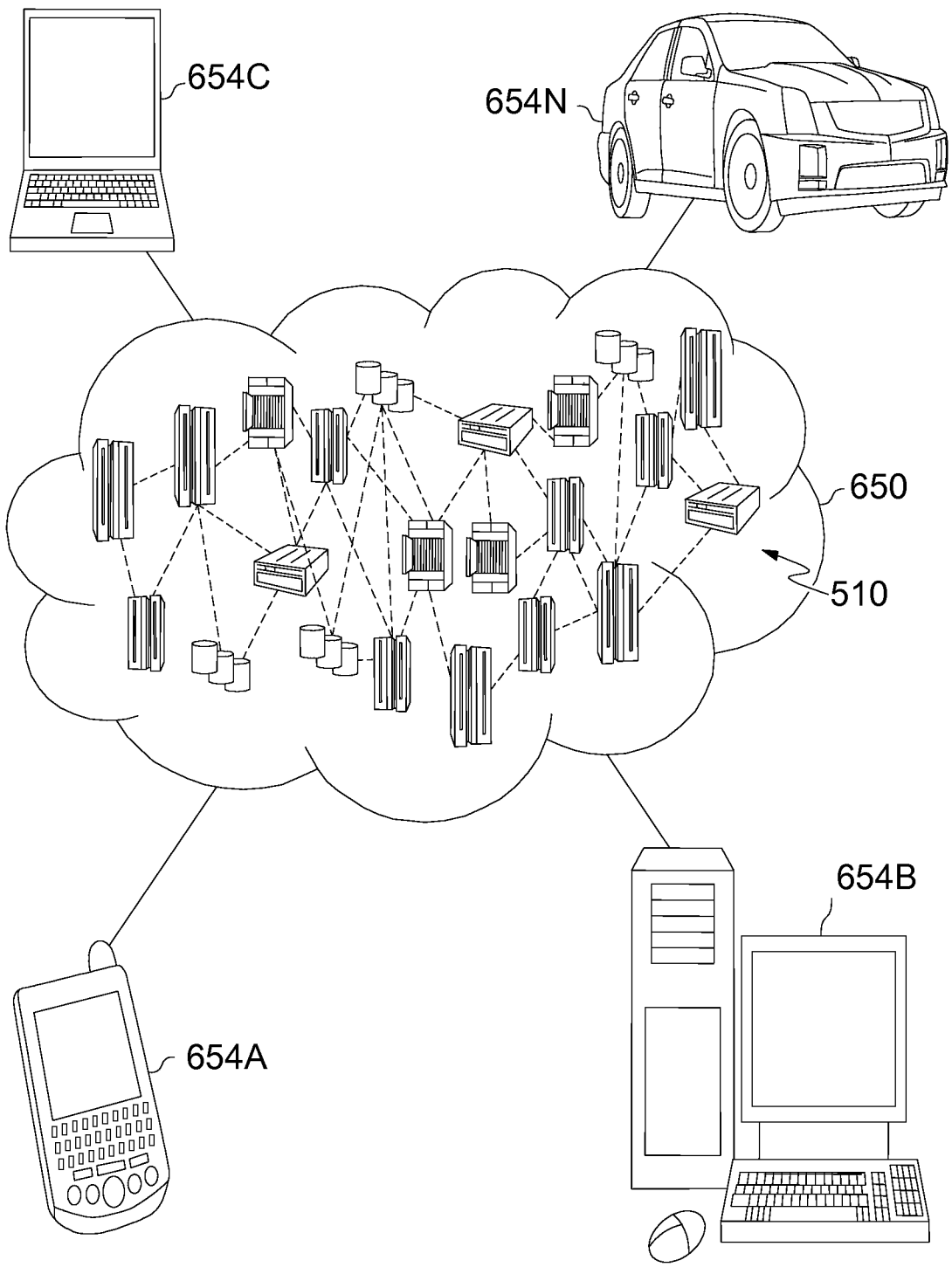
FIG. 6 depicts a cloud computing environment in accordance with certain embodiments.

Referring now to FIG. 6, illustrative cloud computing environment 650 is depicted. As shown, cloud computing environment 650 comprises one or more cloud computing nodes 510 with which local computing devices used by cloud consumers, such as, for example, personal digital assistant (PDA) or cellular telephone 654A, desktop computer 654B, laptop computer 654C, and/or automobile computer system 654N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 510 and cloud computing environment 650 can communicate with any type of computerized device over any type of network and/or network addressable connection (e.g., using a web browser).

Figure 7:
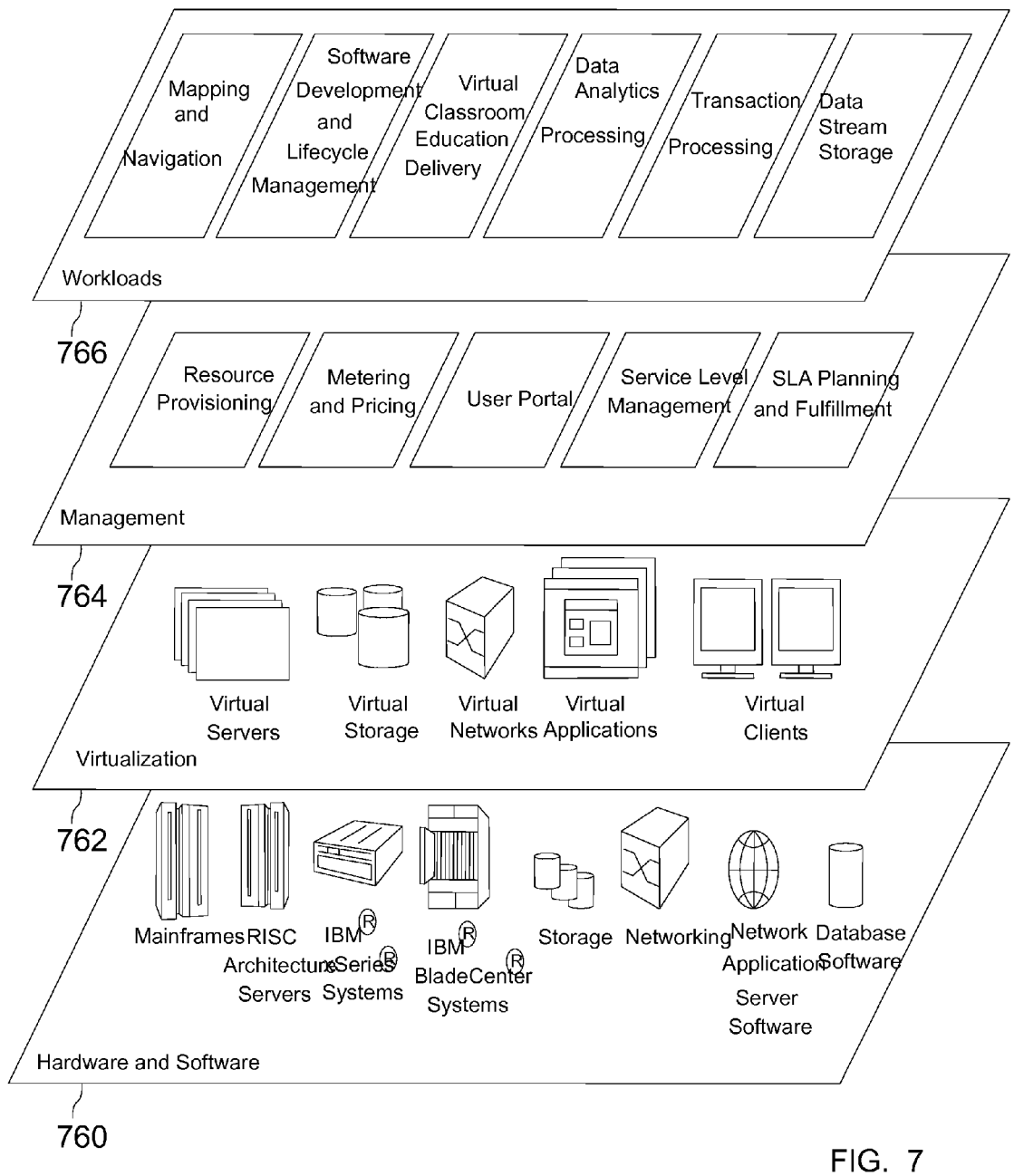
FIG. 7 depicts abstraction model layers in accordance with certain embodiments.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data stream storage.

Thus, in certain embodiments, software or a program, implementing data stream storage in accordance with embodiments described herein, is provided as a service in a cloud environment.

In certain embodiments, BDECMS 200 has the architecture of computing node 510. In certain embodiments, BDECMS 200 is part of a cloud environment. In certain alternative embodiments, BDECMS 200 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

Figure 8:
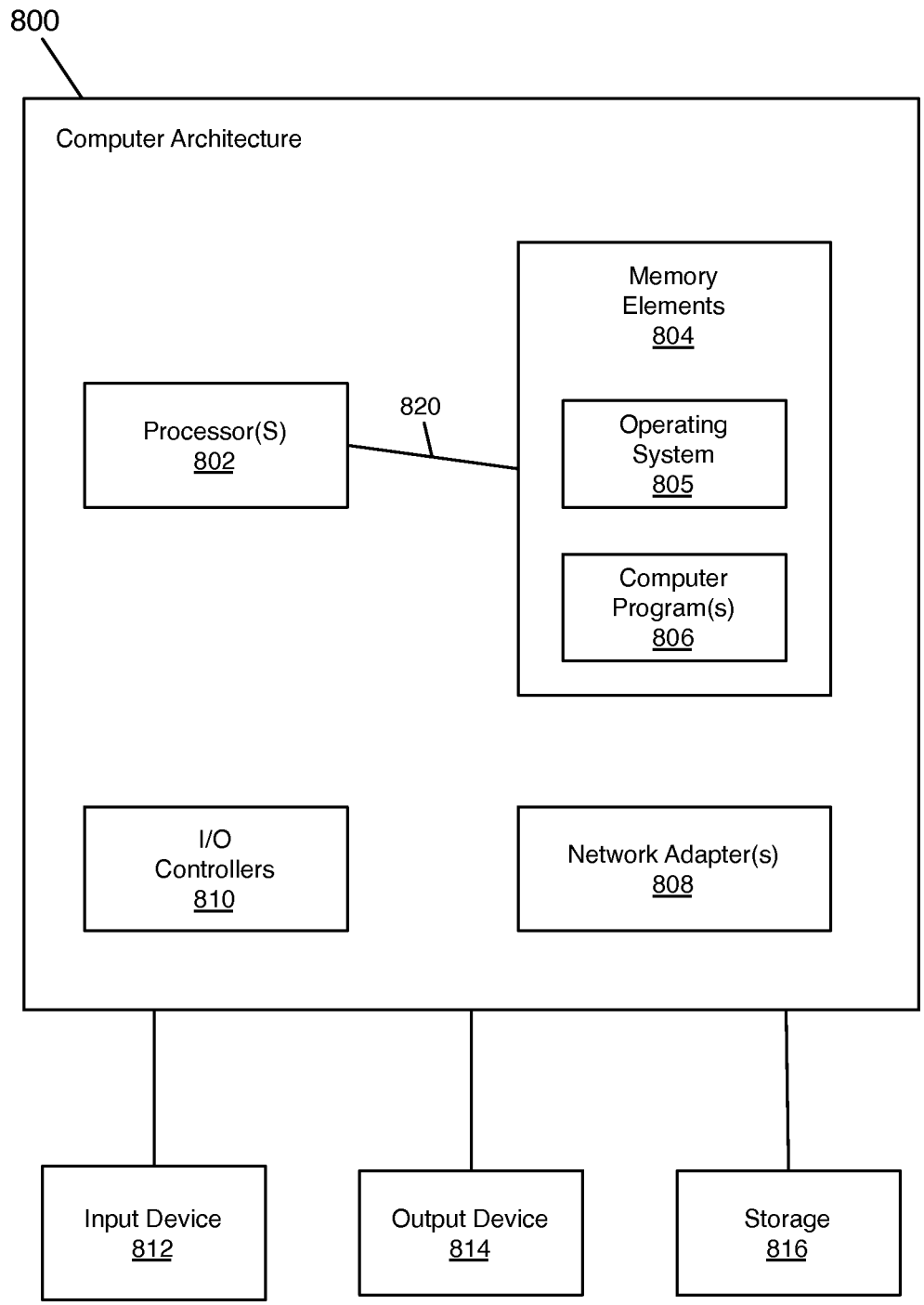
FIG. 8 illustrates, in a block diagram, a computer architecture that may be used in accordance with certain embodiments.

FIG. 8 illustrates a computer architecture 800 that may be used in accordance with certain embodiments. In certain embodiments, library server main mode 210, library server nodes 220, data server 30 object processor 40 and Big Data Stream Processor 230 may implement computer architecture 800. The computer architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The computer architecture 800 may be coupled to a storage device 816. The storage device 816 may comprise an internal storage device or an attached or network accessible storage. Computer programs 806 in storage device 816 may be loaded into the memory elements 804 and executed by at least one processor 802 in a manner known in the art.

The computer architecture 800 may include fewer components than illustrated, additional components not illustrated herein, or some combination of the components illustrated and additional components. The computer architecture 800 may comprise any computing device known in the art, such as a mainframe, server, personal computer, workstation, laptop, handheld computer, telephony device, network appliance, virtualization device, storage controller, etc.

What is claimed is:

1. A computer implemented method for storing a data stream, comprising:
   providing a big data enterprise content management system with a distributed library server, a plurality of data servers, and a big data stream processor, wherein the distributed library server includes 1) a library server main node that includes a data type table that identifies data types and a node table and 2) a plurality of library server nodes, wherein each of the library server nodes contains a logical metadata table, and wherein the logical metadata table is comprised of physical metadata tables that describe storage locations for object parts, by at least one computing processor of a computing system;

mapping a data type to at least one of the plurality of data servers, by the at least one computing processor of the computing system by:
  identifying the data type among the data types in the data type table;
  identifying a logical metadata table of one of the library server nodes using the data type table;
  identifying a physical metadata table using the logical metadata table, wherein the physical metadata table identifies a node; and
  using the node table to map the node identified in the physical metadata table to the at least one of the plurality of data servers;
selecting a portion of the data stream containing data of the data type, by the at least one computing processor of the computing system;
generating an object part including the portion of the data stream, by the at least one computing processor of the computing system; and
storing the object part at the at least one of the plurality of data servers mapped to the data type of the data, by the at least one computing processor of the computing system.

2. The method of claim 1, further comprising:
storing the data stream as a collection of object parts.

3. The method of claim 1, wherein selecting further comprises:
  receiving a control signal; and
  upon receiving the control signal, identifying the portion.

4. The method of claim 1, wherein selecting further comprises:
  determining a data format of the portion of the data stream; and
  upon a change of the data format, identifying the portion.

5. The method of claim 1, further comprising:
indexing the object part with text information contained in the data stream.

6. The method of claim 1, further comprising:
processing the data stream with an executable process.

7. The method of claim 6 further comprising:
executing the executable process at a node determined by the distributed library server.

8. A system for storing a data stream, comprising:
a processor; and
a storage device connected to the processor, wherein the storage device has stored thereon a program, wherein the processor is configured to execute instructions of the program to perform operations, and wherein the operations comprise:
providing a big data enterprise content management system with a distributed library server, a plurality of data servers, and a big data stream processor, wherein the distributed library server includes 1) a library server main node that includes a data type table that identifies data types and a node table and 2) a plurality of library server nodes, wherein each of the library server nodes contains a logical metadata table, and wherein the logical metadata table is comprised of physical metadata tables that describe storage locations for object parts;
mapping a data type to at least one of the plurality of data servers by:
  identifying the data type among the data types in the data type table;
  identifying a logical metadata table of one of the library server nodes using the data type table;
  identifying a physical metadata table using the logical metadata table, wherein the physical metadata table identifies a node; and
  using the node table to map the node identified in the physical metadata table to the at least one of the plurality of data servers;
selecting a portion of the data stream containing data of the data type;
generating an object part including the portion of the data stream; and
storing the object part at the at least one of the plurality of data servers mapped to the data type of the data.

9. The system of claim 8, wherein the operations further comprise:
storing the data stream as a collection of object parts.

10. The system of claim 8, wherein the operation of selecting includes:
  receiving a control signal; and
  upon receiving the control signal, identifying the portion.

11. The system of claim 8, wherein the operation of selecting includes:
  determining a data format of the portion of the data stream; and
  upon a change of the data format, identifying the portion.

12. The system of claim 8, wherein the operations further comprise:
indexing the object part with text information contained in the data stream.

13. The system of claim 8, wherein the operations further comprise:
processing the data stream with an executable process.

14. The system of claim 13, wherein the operations further comprise:
executing the executable process at a node determined by the distributed library server.

15. A computer program product for storing a data stream, the computer program product comprising:
a non-transitory computer readable storage medium having computer readable program code embodied therewith, the computer readable program code, executable by at least one processor of a computer is configured to perform:
providing a big data enterprise content management system with a distributed library server, a plurality of data servers, and a big data stream processor, wherein the distributed library server includes 1) a library server main node that includes a data type table that identifies data types and a node table and 2) a plurality of library server nodes, wherein each of the library server nodes contains a logical metadata table, and wherein the logical metadata table is comprised of physical metadata tables that describe storage locations for object parts;
mapping a data type to at least one of the plurality of data servers by:
  identifying the data type among the data types in the data type table;
  identifying a logical metadata table of one of the library server nodes using the data type table;
identifying a physical metadata table using the logical metadata table, wherein the physical metadata table identifies a node; and
  using the node table to map the node identified in the physical metadata table to the at least one of the plurality of data servers;
selecting a portion of the data stream containing data of the data type;
generating an object part including the portion of the data stream; and
storing the object part at the at least one of the plurality of data servers mapped to the data type of the data.

16. The computer program product of claim 15, wherein the computer readable program code, executable by the at least one processor of the computer, is configured to perform:
storing the data stream as a collection of object parts.

17. The computer program product of claim 15, wherein the computer readable program code performing the selecting is configured to include:
receiving a control signal; and
upon receiving the control signal, identifying the portion.

18. The computer program product of claim 15, wherein the computer readable program code performing the selecting is configured to include:
determining a data format of the portion of the data stream; and
upon a change of the data format, identifying the portion.

19. The computer program product of claim 15, wherein the computer readable program code, executable by the at least one processor of the computer, is configured to perform:
indexing the object part with text information contained in the data stream.

20. The computer program product of claim 15, wherein the computer readable program code, executable by the at least one processor of the computer, is configured to perform:
processing the data stream with an executable process.

21. The computer program product of claim 20, wherein the computer readable program code, executable by the at least one processor of the computer, is configured to perform:
executing the executable process at a node determined by the distributed library server.

\* \* \* \* \*